US007312884B1

(12) United States Patent
Makitani (10) Patent No.: US 7,312,884 B1
(45) Date of Patent: Dec. 25, 2007

(54) IMAGE READING APPARATUS SELECTIVELY CONNECTABLE TO IMAGE FORMING APPARATUSES VIA A NETWORK

(75) Inventor: Hideyuki Makitani, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,636

(22) Filed: Mar. 3, 2000

(30) Foreign Application Priority Data

Mar. 9, 1999 (JP) ................................ 11-061883

(51) Int. Cl.
*G06F 15/00* (2006.01)
*G06F 13/38* (2006.01)

(52) U.S. Cl. ..................................... 358/1.15; 358/401
(58) Field of Classification Search .......... 358/1.1–1.9, 358/1.11–1.18, 500, 400, 401, 403, 442, 468, 358/296
See application file for complete search history.

(56) References Cited

U.S. PATENT DOCUMENTS

| 4,924,494 | A | * | 5/1990 | Shung .................... 379/100.12 |
| 5,157,726 | A | * | 10/1992 | Merkle et al. ............... 713/176 |
| 5,295,181 | A | * | 3/1994 | Kuo ....................... 379/100.07 |
| 5,579,126 | A | * | 11/1996 | Otsuka ........................ 358/403 |
| 5,598,533 | A | * | 1/1997 | Yokota et al. .............. 358/1.15 |
| 5,825,854 | A | * | 10/1998 | Larson et al. ............. 379/88.14 |
| 5,870,207 | A | * | 2/1999 | Kamimoto et al. .......... 358/438 |
| 5,940,187 | A | * | 8/1999 | Berke ......................... 358/434 |
| 6,097,504 | A | * | 8/2000 | Nobuta ........................ 358/434 |
| 6,166,826 | A | * | 12/2000 | Yokoyama .................. 358/1.16 |
| 6,195,177 | B1 | * | 2/2001 | Marechal ..................... 358/434 |
| 6,262,805 | B1 | * | 7/2001 | Ishikawa et al. ........... 358/1.15 |
| 6,438,574 | B1 | * | 8/2002 | Nagashima .................. 709/102 |
| 6,597,469 | B1 | * | 7/2003 | Kuroyanagi ................ 358/1.15 |
| 6,668,321 | B2 | * | 12/2003 | Nendell et al. ............. 713/169 |

* cited by examiner

*Primary Examiner*—Gabriel Garcia
(74) *Attorney, Agent, or Firm*—Fitzpatrick, Cella, Harper & Scinto

(57) ABSTRACT

When performing remote copying between different apparatuses on a network, authentication of a user ID at the original-reading side is appropriately performed. A copying machine, serving as an image reading apparatus, selects and connects a copying machine, serving as an image forming apparatus according to an input operation of an operator. The copying machine, serving as the image forming apparatus, transmits a request for input of an ID after being connected. The copying machine, serving as the image reading apparatus, transmits an ID according to an input operation of an operator, and the copying machine, serving as the image forming apparatus, transmits information relating to permission/prohibition of reading based on the received ID. The copying machine, serving as the image reading apparatus, reads an image of an original based on the information relating to the permission/prohibition, compresses an image signal representing the read image and transmits the compressed image signal to the copying machine, serving as the image forming apparatus. The copying machine, serving as the image forming apparatus, expands the compressed image signal, and then prints the corresponding image.

8 Claims, 4 Drawing Sheets

SELECT OUTPUT-SIDE PRINTER.

| PRINTER NAME |
| --- |
| PRINTER-6F-North (Local) |
| PRINTER-6F-South (Remote) |
| PRINTER-6F-East (Remote) |
| PRINTER-6F-West (Remote) |

CANCEL

OK

▼ ▲

F102

INPUT DIVISION ID.

DIVISION ID [1 2 3 4]

CANCEL

OK

IMAGE READING APPARATUS SELECTIVELY CONNECTABLE TO IMAGE FORMING APPARATUSES VIA A NETWORK

BACKGROUND OF THE INVENTION

1. Field of the Invention

The present invention relates to an image reading apparatus that can be selectively connected to a plurality of image forming apparatuses via a network, and a method of implementing the same, a selected image forming apparatus and method, a communication system comprising the image reading apparatus and the image forming apparatus, and a storage medium capable of being read by a computer used in the above-described apparatus, method, or system.

2. Description of the Related Art

Conventionally, in a copying function of a copier, use by a user is managed by displaying a picture surface requesting input of an ID number or insertion of a card at the first of a copying operation flow, and prohibiting other operations.

On the other hand, a system for realizing a remote copying operation has been devised, in which a scanner or a printer is provided on a network, and an image read by the scanner is transmitted to a printer in order to print the image.

However, in the above-described system, an operation panel is present at the scanner side, with the scanner connected to a plurality of printers. When a copying operation is performed by selection of one printer by the user, a system for managing use by the user when accepting a request for copying is not taken into consideration. For example, when various types of printers, such as printers where usage is managed, printers where the user is not managed, printers having different user data, and the like, are connected to one scanner, appropriate management for each printer is not taken into consideration. Accordingly, there exist problems such that, for example, when allocating a fee to a user in accordance with use of a printer, appropriate processing for allocating a fee cannot be performed.

SUMMARY OF THE INVENTION

According to one aspect of the invention, an image reading apparatus, connected to a plurality of external printing apparatuses via a network, includes: (1) generation means for reading an image and generating an image signal; (2) selection means for selecting one from the plurality of external printing apparatuses; (3) determination means for determining whether or not the selected external printing apparatus needs input user management information; (4) input control means for controlling the input of the user management information so as to be inputted, when the result of the determination indicates affirmative; (5) output means for outputting the inputted user management information to the selected external printing apparatus; (6) reception means for receiving, from the selected external printing apparatus, availability information indicating whether or not the using of the selected external pringing apparatus is allowed, wherein the availability information is determined based on the output of the user management information; and (7) transmission control means for controlling transmission such that the generated image signal is transmitted to the selected external printing apparatus, when the availability information indicates affirmative.

According to another aspect of the present invention, an image reading method for controlling an image reading apparatus, connected to a plurality of external printing apparatuses via a network, includes the steps of: (1) reading an image and generating an image signal on the basis of reading the image; (2) selecting one from the plurality of external printing apparatuses; (3) determining whether or not the selected external printing apparatus needs input of user management information; (4) controlling the input of the user management information so as to be inputted when the result of the determination made in said determining step indicates affirmative; (5) outputting the inputted user management information to the selected external printing apparatus; (6) receiving from the selected external printing apparatus, availability information indicating whether or not the using of the selected external printing apparatus is allowed, wherein the availability information is determined based on the output of the user management information; and (7) controlling transmission such that the generated image signal is transmitted to the selected external printing apparatus, when the availability information indicates affirmative.

According to still another aspect of the present invention, a computer readable memory storing a program executing an image reading method for controlling an image reading apparatus, connected to a plurality of external printing apparatuses via a network, the program including: (1) code for reading an image and generating an image signal on the basis of reading the image; (2) code for selecting one from the plurality of external printing apparatuses; (3) code for determining whether or not the selected external printing apparatus needs input of user management information; (4) code for controlling the input of the user management information so as to be inputted when the result of the determination made by said code for said determining step indicates affirmative; (5) code for outputting the inputted user management information to the selected external printing apparatus; (6) code for receiving from the selected external printing apparatus, availability information indicating whether or not the using of the selected external printing apparatus is allowed, wherein the availability information is determined based on the output of the user management information; and (7) code for controlling transmission such that the generated image signal is transmitted to the selected external printing apparatus, when the availability information indicates affirmative.

The foregoing and other objects, advantages and features of the present invention will become more apparent from the following description of the preferred embodiments taken in conjunction with the accompanying drawings.

DETAILED DESCRIPTION OF THE PREFERRED EMBODIMENT

A preferred embodiment of the present invention will now be described in detail with reference to the drawings.

Figure 2:
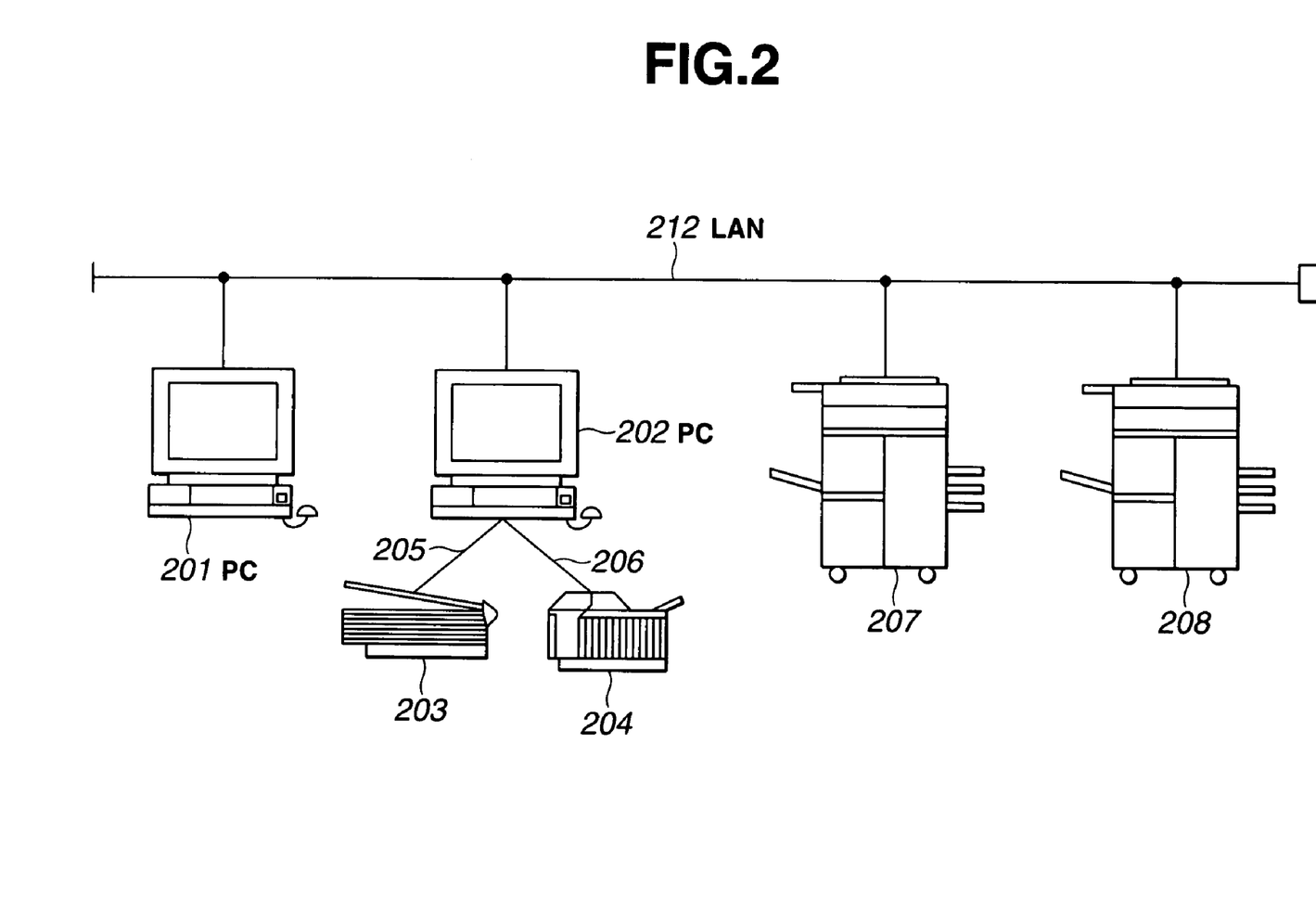
FIG. 2 is a diagram illustrating the configuration of the entire network system to which the present invention is applied.

FIG. 2 is a diagram illustrating the configuration of a network system to which the present invention can be applied.

In FIG. 2, the network system includes personal computers (hereinafter termed "PCs") 201 and 202, a scanner unit 203, a printer unit 204, copying machines 207 and 208, and a LAN (local area network) 212.

The PC 201 is a computer, which is usually used by a user, forms a document and exchanges electronic mail with other computers connected via the LAN 212. The PC 202 is the same as the PC 201, and is connected to the LAN 212. The scanner unit 203 and the printer unit 204 are connected to the PC 202 via a general-purpose computer interface provided in the PC 202.

The scanner unit 203 is used, for example, for pasting an image read by the scanner unit 203 on a document formed on the PC 202. The printer unit 204 is used for printing a document formed on the PC 202. A system comprising the PC 202, the scanner unit 203 and the printer unit 204 has a simple copying function of printing an image read by the scanner unit 203 using the printer unit 204.

The printer unit 204 is a device capable of performing monochromatic printing as well as high-quality color image printing, and performs different authentication operations depending on jobs requested by the user.

That is, in the case of high-quality color image printing, by requesting a user ID, a division ID, a title ID, or the like, whether or not the user is permitted to use the printer 204 is determined based on the title ID, and the user for whom a fee is to be claimed is specified according to the division ID and the user ID. When performing only monochromatic printing, only a user ID is requested.

The copying machine 207 is an image forming apparatus having a large liquid-crystal touch panel, and is connected to the LAN 212. It has both a scanner function as an image reading apparatus, and a printer function. As a single unit, the copying machine 207 has a copying function as well as the function of printing data from a computer, or the like, i.e., the function of receiving a document or the like formed in the PC 201 or 202, or the like, together with command data for image formation via the LAN 212, developing the received data into bit-map image data, and printing the data. The copying machine 208 also has the same function. The copying machine 207 or 208 requests a user ID in order to authenticate the user.

Figure 1:
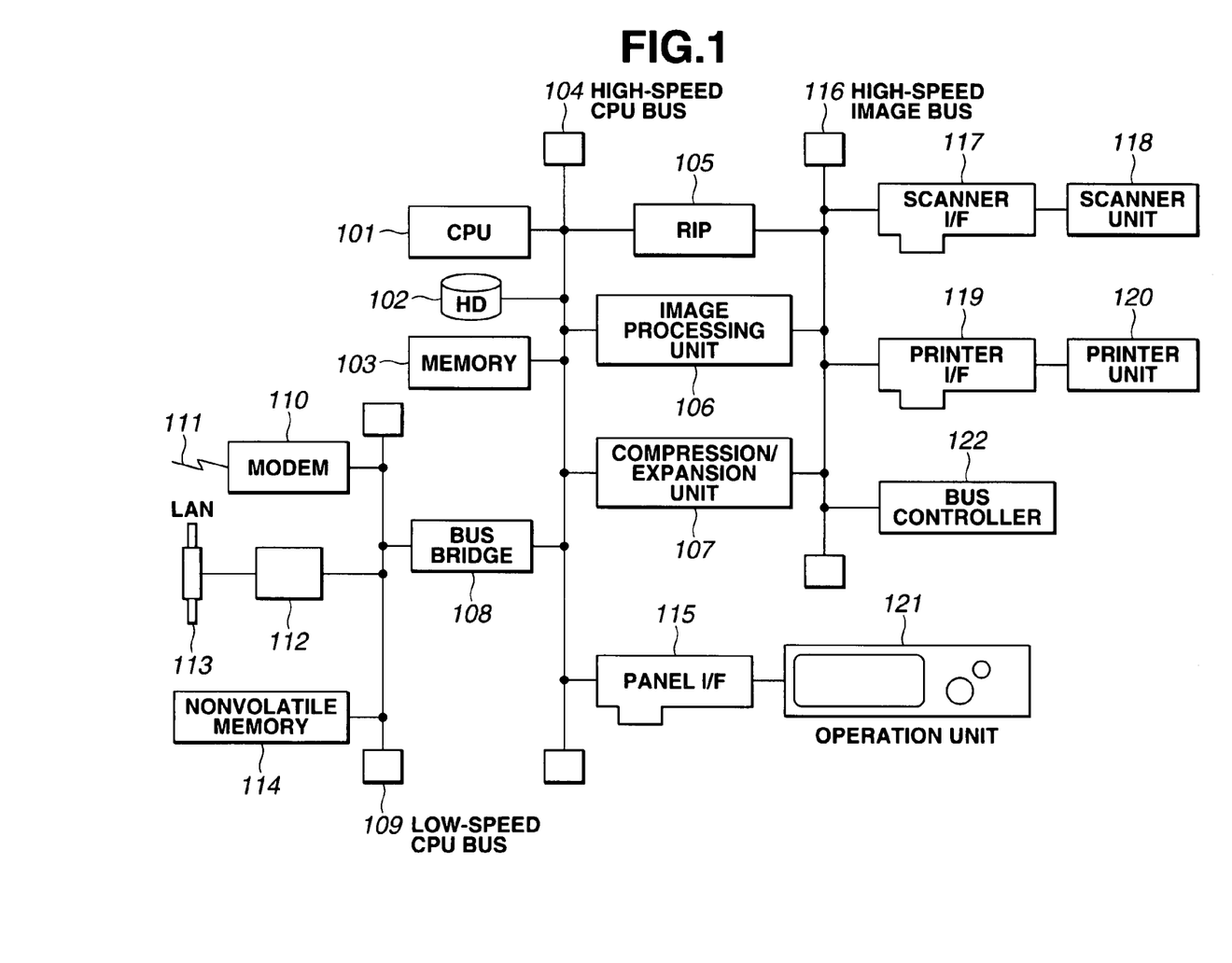
FIG. 1 is a block diagram illustrating the configuration of an image forming apparatus according to an embodiment of the present invention.

Next, a description will be provided of a common portion of the image reading apparatus and the image forming apparatus according to the present invention which constitute the above-described network system, with reference to FIG. 1.

In FIG. 1, a CPU 101 is a microprocessor for controlling the apparatus, and operates according to a real-time OS (operating system). A HD 102 is a large-capacity hard disk for storing a plurality of application programs used for the operation of the CPU 101, and is controlled by the CPU 101. A memory 103 is a working memory used for the operation of the CPU 101, and can be accessed from the CPU 101 at a high speed.

A high-speed CPU bus 104 is a bus used for interconnecting the above-described CPU 101, HD 102 and memory 103 and respective functional units (to be described later), and transfers data processed by the CPU 101 to the respective functional units and performs high-speed transfer (DMA (direct memory address) transfer) of data between the respective functional units. A PCI (peripheral component interconnect) bus is generally used as the CPU bus 104. A RIP 105 is a functional unit which receives an image forming command input from an external interface connected to a computer (to be described later) and converts received data into a bit-map image in accordance with the contents of the command. The image forming command is input from the high-speed CPU bus 104, and is used for outputting an image to a high-speed image bus 116. Postscript, PCL, LIPS, CaPSL, or the like is used for the RIP 105.

An image processing unit 106 is a functional unit for performing filtering processing, such as smoothing processing, edge processing, and the like, for an image input from a high-speed image bus 116 according to a processing command from the CPU 101. The image processing unit 106 also has a character recognition (OCR) function and an image separation function for separating a character portion from an image portion for an image input from the high-speed image bus 116.

A compression/expansion unit 107 has the function of compressing an image input from the high-speed image bus 116 according to an image compressing method, such as MH (modified Huffman), MR (modified READ), MMR (modified modified READ), JPEG (Joint Photographic Experts Group), or the like, transmitting the compressed data to the high-speed CPU bus 104 or again to the high-speed image bus 116, expanding the compressed data input from one of the two buses based on the used compression method, and transmitting the expanded data to the high-speed image bus 116.

A bus bridge 108 is a bus-bridge controller for interconnecting the high-speed bus 104 and a low-speed CPU bus 109 (to be described later), and absorbs the difference in the processing speed between the buses. By using the bus bridge 108, the high-speed CPU 101 can access a functional unit which is connected to the low-speed CPU bus 109 and operates at a low speed.

The low-speed CPU bus 109 has a transfer speed lower than the transfer speed of the high-speed CPU bus 104, and is used for connecting a functional unit which has a relatively low processing capability. An ISA (Industry Standard Architecture) bus, or the like, is generally used as the CPU bus 109. A modem 110 is a functional unit provided between a public telephone line 111 and the low-speed CPU bus 109, and has the function of modulating digital data transmitted from the low-speed CPU bus 109 so as to be transmitted to the public telephone line 111, and the function of converting modulated data transmitted from the public telephone line 111 into digital data which can be processed within the image forming apparatus.

A LAN 112 is a functional unit for connecting the apparatus to a local network, and is used for transmitting/receiving data with the local network. The Ethernet, or the like, is generally used as the local network. A nonvolatile memory 114 is a rewritable nonvolatile memory for storing registration division ID numbers corresponding to user IDs and/or division IDs in a corporation or the like, serving as management information relating to respective users, and an accumulated count value of output for the corresponding division. A flash ROM (read-only memory), or the like, is generally used as the nonvolatile memory 114. An accumulated count value for each use (color, black-and-white, or the like) and an accumulated count value for each title are also stored in the nonvolatile memory 114 in the printer unit 204.

A panel interface 115 exchanges various control signals with an operation unit 121, and is a unit for transmitting a signal from an input switch, such as a key or the like, provided on the operation unit 121 to the CPU 101, and performing resolution conversion for displaying image data formed in the RIP 105, the image processing unit 106, or the compression/expansion unit 107 on a liquid-crystal display unit provided on the operation unit 121.

The high-speed image bus 116 interconnects image input/output buses of the respective image generation units (the RIP 105, the image processing unit 106 and the compression/expansion unit 106) to a scanner interface 117 and a printer interface 119 (to be described later). This bus 116 is not controlled by the CPU 101, and performs data transfer under the control of a bus controller 122 (to be described later).

A scanner unit 118 is a visual-image reading device including an automatic original-feeder, and includes a CCD color sensor for the three R, G and B lines, or a CCD line sensor for a black-and-white line. Image data read by the scanner unit 118 is transferred to the high-speed image bus 116 via the scanner interface unit 117.

The scanner interface unit 117 has the function of performing optimum binary-coding processing of image data read by the scanner unit 118 in accordance with the contents of processing in the preceding procedure, performing serial-parallel conversion in accordance with the data width of the high-speed image bus 116, and converting read R, G and B three-primary-color data into C, M, Y and Bk data.

A printer unit 120 prints image data received from the printer interface 119 as visual image data on a recording sheet. A bubble jet printer for performing printing on a recording sheet using a bubble-jet method, a laser-beam printer for forming an image on a photosensitive drum utilizing a laser beam, and forming an image on a recording sheet according to an electrophotographic technique, or the like, is used as the printer unit 120. There exist monochromatic laser-beam printers, and C, M, Y and Bk color laser-beam printers.

The printer interface unit 119 transfers image data transmitted from the high-speed image bus 116 to the printer unit 120, and has a bus-width conversion function of converting the bus width of the high-speed image bus 116 into a bus width corresponding to the gradation of the output-side printer, and a function for absorbing the difference between the printing speed of the printer and the image-data transfer speed of the high-speed image bus 116.

The operation unit 121 has a liquid-crystal display unit and a touch-panel input device attached on the liquid-crystal display unit, and a plurality of hard keys. A signal input through the touch panel or one of the hard keys is transmitted to the CPU 101 via the panel interface 115, and the liquid-crystal display unit displays image data transmitted from the panel interface 115. Functions, image data and the like in an operation in the image forming apparatus are displayed on the liquid-crystal display unit.

Next, a description will be provided of an authentication operation and a printing operation when performing remote copying, which are principal operations in this embodiment.

In this embodiment, the copying machine 207 is used as the image reading device of the invention, and the copying machine 208 which requests a user ID for authentication is used as the image forming apparatus of the invention. A description will be provided of the procedure of a remote copying operation in which the copying machine 207 performs an operation of inputting a user ID and an original-reading operation, and read data is transferred to and printed by the copying machine 208, with reference to the flowchart shown in FIG. 3.

In this embodiment, the image reading apparatus asks the image forming apparatus selected by selection means whether or not input of management information from the operator is to be requested. When it is determined that the input is to be requested, a message requesting input of the management information is displayed in order to input the management information. The input management information is transmitted to the image forming apparatus, permission/prohibition of a copying operation is asked, and a message indicating the capability of a copying operation is displayed when the copying operation can be performed.

Figure 3:
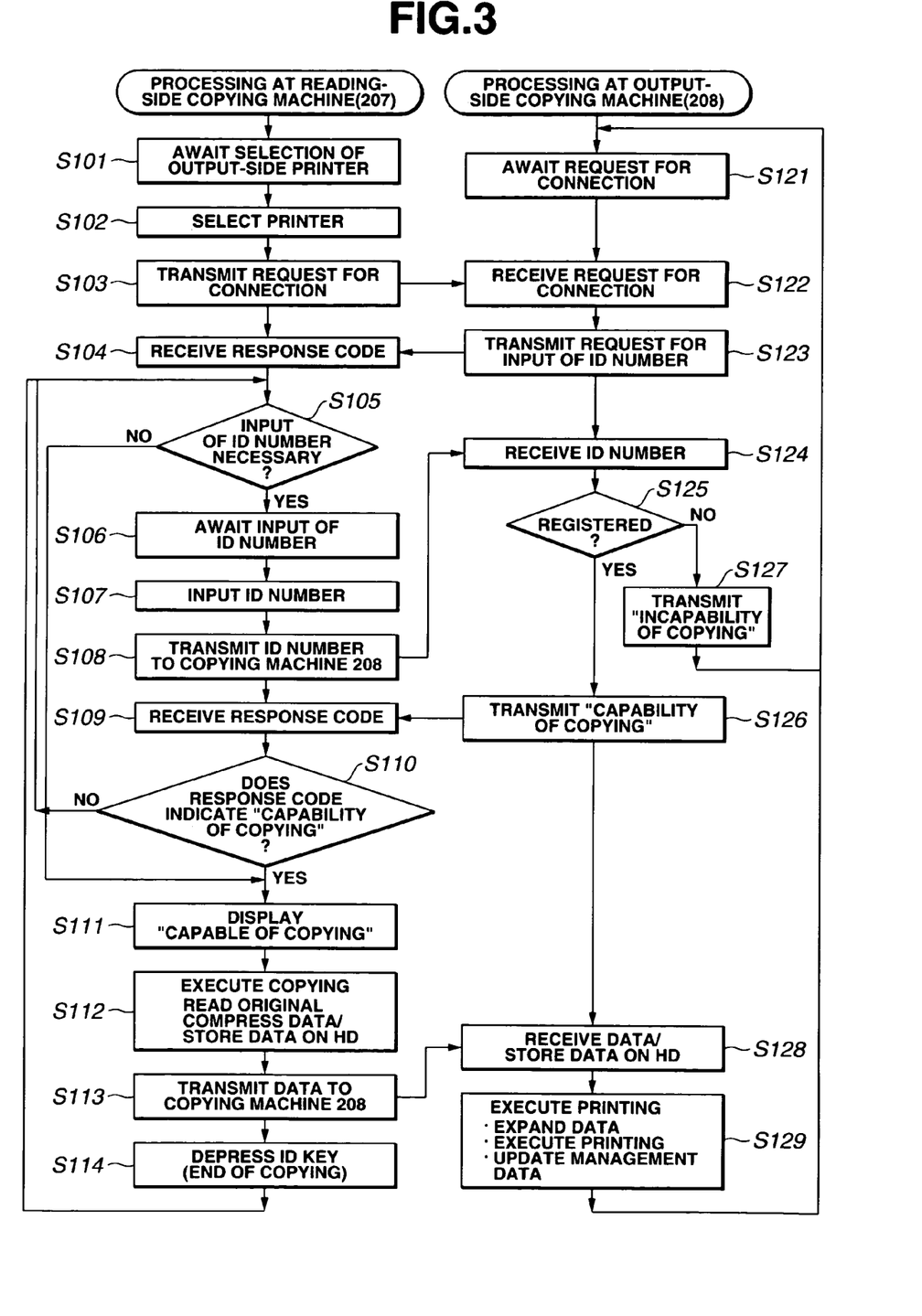
FIG. 3 is a flowchart illustrating the flow of processing when performing a remote copying operation.
Figure 4:
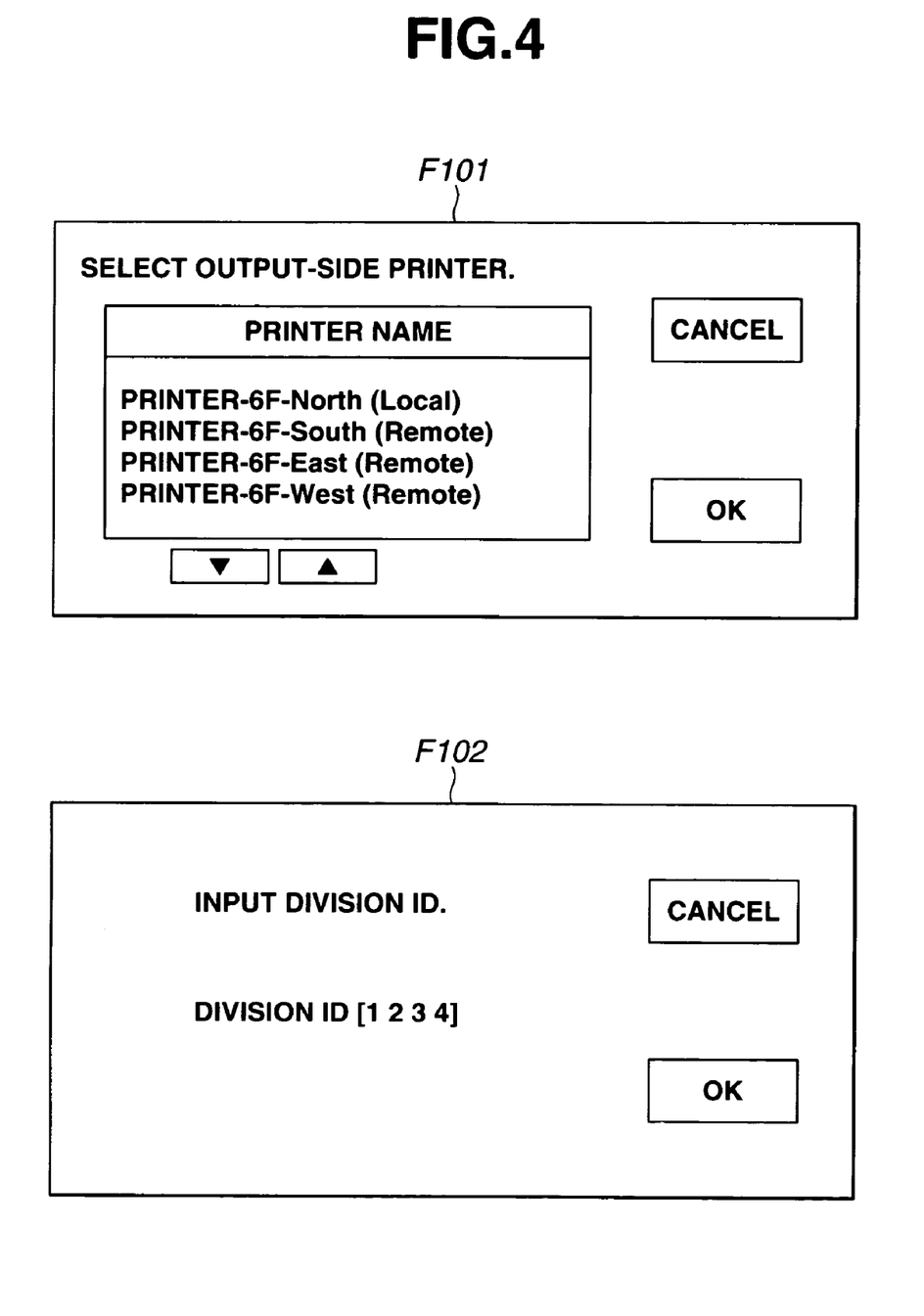
FIG. 4 is a diagram illustrating the configuration of picture frames displayed on an operation unit.

In FIG. 3, in step S101, a message requesting selection of an output-side printer as indicated by F101 in FIG. 4 is displayed on a copying-operation picture frame on the operation unit 121 of the copying machine 207. When the user has selected the copying machine 208 as the output-side printer in step S102, then, in step S103, a request for connection is transmitted to the selected copying machine 208 via the LAN 212.

Upon reception of a request for connection from the copying machine 207 in a state of awaiting reception of a request for connection in step S121, the copying machine 208 transmits a response of requesting input of an ID number (step S123). Upon reception of a response code in step S104, the copying machine 207 determines if input of an ID number is necessary (step S105). If the result of the determination in step S105 is negative, the process proceeds to step S111, where a message of "capable of copying" is displayed. If the result of the determination in step S105 is affirmative, a message requesting input of an ID number as indicated by F102 shown in FIG. 4 is displayed, to provide a state of awaiting input of an ID number (step S106).

When the user has input a four-digit ID number (a division ID in this case) in step S107, then, in step S108, the copying machine 108 transmits the input ID number to the copying machine 208 via the LAN 212. Upon reception of the ID number in step S124, the copying machine 208 determines if there is an ID number which coincides with the received ID number from among ID numbers registered in the nonvolatile memory 114 (step S125). If the result of the determination in step S125 is affirmative, the copying machine 208 transmits a response code indicating permission of copying to the copying machine 207 via the LAN 212 (step S126). If the result of the determination in step S125 is negative, the copying machine 208 transmits a response code indicating prohibition of copying to the copying machine 207 via the LAN 212 (step S127).

Upon reception of the response code indicating permission of copying in step S109, the copying machine 207 displays a message indicating "capable of copying" on the operation unit 121, and accepts a copying operation (step S111). When copying is prohibited, the process returns to step S105, where input of an ID number is determined.

When a cancel key has been selected on the picture frame in the state of awaiting input of an ID number in step S106, or in the state of accepting copying in step S111, the process returns to the picture frame for selecting an output-side printer in step S101.

In step S112, when the user has instructed start of copying, the copying machine 207 starts original-reading processing. Original image data is read from the scanner unit 118, and the read data is transmitted to the compression/expansion unit 107 via the scanner interface 117 and the high-speed image bus 116. The data compressed in the compression/expansion unit 107 is stored in the memory 103 via the high-speed CPU bus 104. The data stored in the memory 103 is stored on the HD 102 according to an instruction from the CPU 101. The original-reading processing is terminated after repeating the above-described operation for the number of times corresponding to the number of originals.

Then, in step S113, the copying machine 207 transmits the data stored on the HD 102 to the copying machine 208 via the high-speed CPU bus 104, the bus bridge 108, the LAN 112 and the LAN 113. Upon completion of the transmission of all data, the processing at the copying machine 207 is terminated. When the user has instructed to end of the copying operation by depressing the ID key in step S114, the copying machine 207 returns to step S105, where input of an ID number is determined.

In the copying machine 208, in step S128, data received via the LAN 113 is stored on the HD 102. In step S129, upon completion of the reception of all data, the copying machine 208 starts a printing operation. The CPU 101 sequentially reads data stored on the HD 102 for respective pages, and stores the read data in the memory 103. The data is then transmitted to the compression/expansion unit 107 via the high-speed CPU bus 104. The image data subjected to expansion processing in the compression/expansion unit 107 is transmitted to the printer unit 120 via the high-speed image bus 116 and the printer interface 119, and the printer unit 120 prints the transmitted data.

The CPU 101 updates accumulated output data corresponding to the received ID number from among management data stored in the nonvolatile memory 114 every time printing is performed on each sheet. This operation is repeated for the number of pages. Upon completion of printing of all data, the copying machine 208 returns to the state of awaiting reception of a request for connection in step S121.

The copying sequence according to input of the ID number is terminated in the above-described manner.

As described above, in a system in which a remote copying function is realized by performing reading of an original and printing in different apparatuses interconnected via a network, by performing a user authentication operation at the original-reading side after assigning the output-side printer, it is possible to perform an appropriate authentication operation even if different user authentication methods are provided for respective printers.

Next, a description will be provided of a storage medium according to another embodiment of the present invention.

The system shown in FIG. 1 may be configured by hardware. However, when configuring the system as a computer system including the CPU 101, and a memory, such as the HD 102 or the like, the memory constitute a storage medium according to the present invention. A program for executing the processing procedure for controlling the above-described operation based on the flowchart shown in FIG. 3 is stored in the storage medium.

A semiconductor memory, such as a ROM, a RAM (random access memory), or the like, an optical disk, a magnetooptical disk, a magnetic medium, or the like, may be used as the storage medium. The storage medium may also be configured by a CD(compact disc)-ROM, a floppy disk, a magnetic tape, a magnetic card, a nonvolatile memory card, or the like.

Accordingly, functions and effects equivalent to the functions and effects of the above-described embodiment may also be realized and the objects of the present invention may also be achieved by using the storage medium in another system or apparatus than the system or apparatus shown in FIG. 1, and reading and executing program codes stored in the storage medium by the system or a computer.

Functions and effects equivalent to the functions and effects of the above-described embodiments may also be realized and the objects of the present invention may also be achieved when an OS, or the like, operating in a computer performs a part or the entirety of processing, or when, after writing program codes read from the storage medium into a memory provided on a function expanding board inserted in a computer or on a function expanding unit connected to the computer, a CPU, or the like, provided in the function expanding board or the function expanding unit performs a part or the entirety of processing, based on instructions of the program codes.

As described above, according to the embodiments of the present invention, by performing user authentication after determining an image forming apparatus, in an image reading apparatus connected to a plurality of image forming apparatuses, it is possible to perform appropriate user management even when the image reading apparatus is connected to an image forming apparatus having different user management, such as division management or the like.

It is also possible to appropriately perform fee allocating processing, and the like, by appropriately performing user management.

The individual components shown in outline or designated by blocks in the drawings are all well known in the image reading apparatus and method, image forming apparatus and method, image communication system and method, and computer readable storage medium arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus, connected to a plurality of external printing apparatuses via a network, said image reading apparatus comprising:
    generation means for reading an image and generating an image signal;
    selection means for selecting one from the plurality external printing apparatuses;
    determination means for determining whether user management information is needed or not by asking the selected external printing apparatus whether input of the user management information by a user is needed or not;
    input control means for controlling the input of the user management information so as to be inputted, when the result of the determination indicates affirmative, and so as not to be inputted when the result of the determination indicates negative;
    output means for outputting the inputted user management information to the selected external printing apparatus;
    reception means for receiving, from the selected external printing apparatus, availability information indicating whether or not the using of the selected external printing apparatus is allowed, wherein the availability information is determined based on the output of the user management information; and
    transmission control means for controlling transmission such that the generated image signal is transmitted to the selected external printing apparatus, when the availability information indicates affirmative.

2. An image reading apparatus according to claim 1, wherein said transmission control means compresses the image signal prior to transmitting the image signal.

3. An apparatus according to claim 1, wherein said selection means selects the external printing apparatus according to the generated image signal.

4. An apparatus according to claim 1, wherein the management information relating to a user includes at least one of a user ID, a division ID, or a title ID for the authentication determination at the selected external printing apparatus.

5. An image reading method for controlling an image reading apparatus, connected to a plurality of external printing apparatuses via a network, said image reading method comprising the steps of:

reading an image and generating an image signal on the basis of reading the image;

selecting one from the plurality of external printing apparatuses;

determining whether user management information is needed or not by asking the selected external printing apparatus whether input of the user management information by a user is needed or not;

controlling the input of the user management information so as to be inputted when the result of the determination made in said determining step indicates affirmative, and so as not to be inputted when the result of the determination indicates negative;

outputting the inputted user management information to the selected external printing apparatus;

receiving from the selected external printing apparatus, availability information indicating whether or not the using of the selected external printing apparatus is allowed, wherein the availability information is determined based on the output of the user management information; and controlling transmission such that the generated image signal is transmitted to the selected external printing apparatus, when the availability information indicates affirmative.

6. An image reading method according to claim 5, wherein said control step includes compressing the image signal prior to transmitting the image signal.

7. A computer readable memory storing a program executing an image reading method for controlling an image reading apparatus, connected to a plurality of external printing apparatuses via a network, said program comprising:

code for reading an image and generating an image signal on the basis of reading the image;

code for selecting one from the plurality external printing apparatuses;

code for determining whether user management information is needed or not by asking the selected external printing apparatus whether input of the user management information by a user is needed or not;

code for controlling the input of the user management information so as to be inputted when the result of the determination made by said code for said determining step indicates affirmative, and so as not to be inputted when the result of the determination indicates negative;

code for outputting the inputted user management information to the selected external printing apparatus;

code for receiving from the selected external printing apparatus, availability information indicating whether or not the using of the selected external printing apparatus is allowed, wherein the availability information is determined based on the output of the user management information; and code for controlling transmission such that the generated image signal is transmitted to the selected external printing apparatus, when the availability information indicates affirmative.

8. A computer readable memory according to claim 7, wherein said control code compresses the image signal prior to transmitting the image signal.

\* \* \* \* \*

UNITED STATES PATENT AND TRADEMARK OFFICE
CERTIFICATE OF CORRECTION

| | |
|---|---|
| PATENT NO. | : 7,312,884 B1 |
| APPLICATION NO. | : 09/518636 |
| DATED | : December 25, 2007 |
| INVENTOR(S) | : Hideyuki Makitani |

It is certified that error appears in the above-identified patent and that said Letters Patent is hereby corrected as shown below:

COLUMN 5

Line 4, "sion/expansion unit 106)" should read --sion/expansion unit 107)--.

COLUMN 6

Line 29, "copying machine 108" should read --copying machine 207--.

COLUMN 8

Line 42, "plurality" should read --plurality of--.

COLUMN 10

Line 10, "plurality" should read --plurality of--.

Signed and Sealed this

Second Day of September, 2008

JON W. DUDAS
*Director of the United States Patent and Trademark Office*